April 13, 1926.

B. W. BROWN 1,580,404

CHILD'S SUPPORT FOR USE IN AUTOMOBILES

Filed March 22, 1924

Witness:
Richard J. Jacker

Inventor:
Bertha Weiler Brown,
By John Howard McElroy,
his Atty.

UNITED STATES PATENT OFFICE.

BERTHA WEILER BROWN, OF LA PORTE, INDIANA, ASSIGNOR TO REINHARDT H. BROWN, OF LA PORTE, INDIANA.

CHILD'S SUPPORT FOR USE IN AUTOMOBILES.

Application filed March 22, 1924. Serial No. 701,012.

*To all whom it may concern:*

Be it known that I, BERTHA WEILER BROWN, a citizen of the United States, and a resident of La Porte, in the county of La Porte and State of Indiana, have invented certain new and useful Improvements in Children's Supports for Use in Automobiles, of which the following is a specification.

My invention is concerned with hammocks, cradles or seats designed for use in an automobile, and which when in use can be securely held in place at its rear end by thrusting the rear supporting frame between the back and the seat cushions down to the seat cushion supporting frame, while its fronts supporting frame rests on the bottom of the body or on the seat, and which can be compactly folded up when it is not in use.

To illustrate my invention, I annex hereto a sheet of drawings in which the same reference characters are used to designate identical parts in all the figures, of which—

Figure 1:
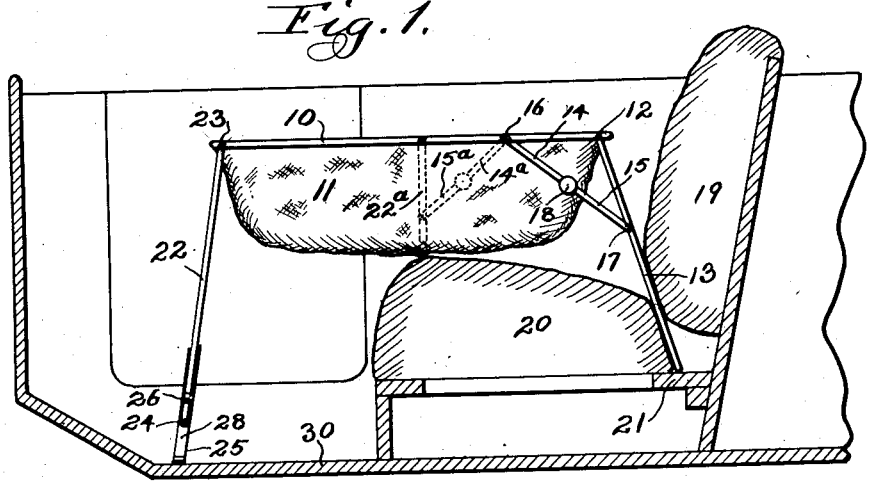
Fig. 1 is a sectional and somewhat diagrammatic view illustrating a portion of an automobile containing my invention applied thereto.

In carrying out my invention for a hammock or cradle, I preferably employ a rectangular main frame 10, which will have the trough portion 11 of the device formed of canvas or some other suitable flexible material, and shaped so that its edges are attached to the frame 10, and so that when the flexible portion is expanded for use, it will produce the generally trough-like arrangement shown in Fig. 1.

Pivoted to the rear end of the frame 10 by the rivets or bolts 12 is a generally U-shaped metallic rear supporting frame 13 which when the device is in use will be thrown to the position shown in Fig. 1, where it is held in position by means of the pair of links 14 and 15 connected at their ends to the main frame at 16 and to the rear supporting frame at 17, and to each other by the locking joints 18, so that when the links are straightened out, as shown in Fig. 1, the rear seat supporting frame 13 will be limited in a fixed position relative to the main frame 10.

When the rear supporting frame has been locked in this position, or prior thereto if desired, its end is thrust down between the lower edge of the back cushion 19 of the automobile and the rear edge of the seat cushion 20, until it engages with the seat frame 21, so that said rear supporting frame is securely held in the desired position.

Figure 2:
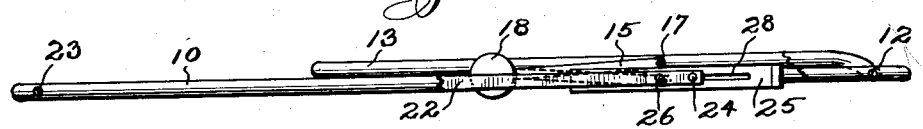
Fig. 2 is a side elevation of the framework of my device folded.
Figure 3:
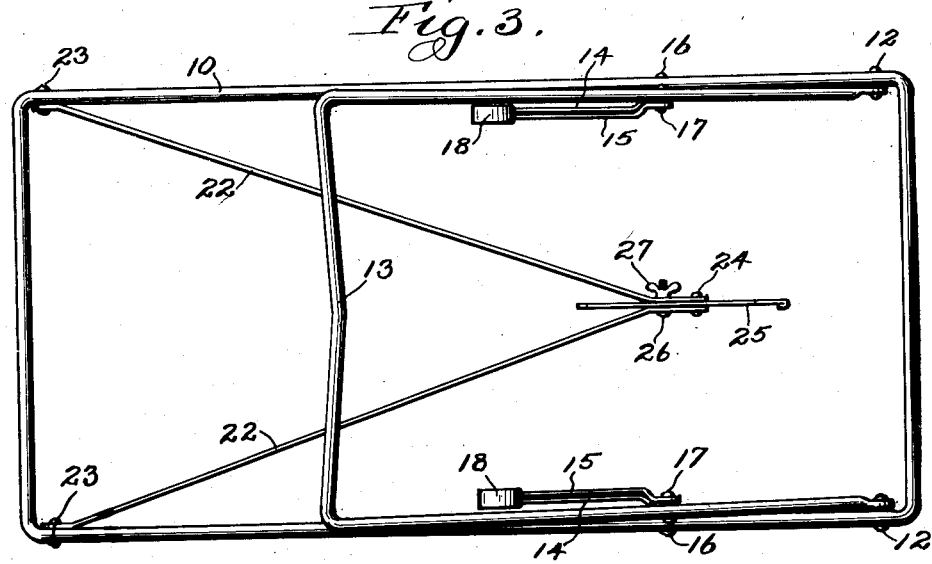
Fig. 3 is a bottom plan view of the same likewise folded.

The front of the main frame 10 will be provided with a suitable front supporting frame, which preferably takes the form of a pair of converging metallic bars 22 pivoted to the main frame at 23, and preferably connected and yet slightly separated at their other ends by the pawl 24, so that the slotted foot 25 can be held between said ends in any desired position of adjustment by the pawl 26 and co-operating thumb nut 27, which bolt passes through suitable registering apertures in the ends of the bars 22 and through an elongated slot 28 in the foot 25. By means of the construction shown, it will be obvious that the effective length of the front supporting frame can be adjusted to vary the angle at which it stands and so that it can be brought in contact with the angle or other object in the bottom 30 of the body of the automobile, so that the device will be held securely in place. When it is not in use, the frame can be collapsed as shown in Figs. 2 and 3, the fabric portion 11 of which will be flattened into a position where it is substantially parallel with the main frame 10.

Where the device is to be used as a seat, the main frame 10 will be cut in two as it were, leaving a U-shaped portion, to the bent ends of which will be pivoted another U-shaped frame 22$^a$, indicated in dotted lines in Fig. 1, which frame will have attached thereto the adjacent edges of the fabric portion 11, which also will be cut in two to conform to the new shape of the device. In this case, I may also provide another pair of links 14$^a$ and 15$^a$, as indicated in dotted lines in Fig. 1, which links will correspond in their construction and mode of operation with the links 14 and 15.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new and desire to secure by Letters Patent of the United States is:

1. The combination with an automobile body having a seat frame, a seat cushion, and a back cushion, of a hollow main crib frame, shorter than the length of the seat cushion and extending transversely thereof from a point toward the rear to a point beyond the front thereof, a flexible trough-like body portion suspended from the main crib frame, a rearwardly and downwardly inclined rear supporting frame pivoted to the rear of the main frame and having its lower end thrust between the rear of the seat cushion and the bottom of the back cushion into contact with the seat frame so as to be held from angular movement between the two cushions and be supported on the seat frame, and means detachable from the automobile to support the front end of the main crib frame therefrom.

2. The combination with an automobile body having a seat frame, a seat cushion, and a back cushion, of a hollow main crib frame, shorter than the length of the seat cushion and extending transversely thereof from a point toward the rear to a point beyond the front thereof, a flexible trough-like body portion suspended from the main crib frame, a rearwardly and downwardly inclined rear supporting frame pivoted to the rear of the main frame and having its lower end thrust between the rear of the seat cushion and the bottom of the back cushion into contact with the seat frame so as to be held from angular movement between the two cushions and be supported on the seat frame, a locking joint mechanism between the main crib frame and the rear supporting frame, and means detachable from the automobile to support the front end of the main crib frame therefrom.

3. The combination with an automobile body having a seat frame, a seat cushion, and a back cushion, of a hollow main crib frame, shorter than the length of the seat cushion and extending transversely thereof from a point toward the rear to a point beyond the front thereof, a flexible trough-like body portion suspended from the main crib frame, a rearwardly and downwardly inclined rear supporting frame pivoted to the rear of the main frame and having its lower end thrust between the rear of the seat cushion and the bottom of the back cushion into contact with the seat frame so as to be held from angular movement between the two cushions and be supported on the seat frame, and a front supporting crib frame pivoted to the front of the main crib frame and having its lower end resting on the bottom of the automobile body.

In witness whereof, I have hereunto set my hand this 19th day of March, 1924.

BERTHA WEILER BROWN.